United States Patent
Yasuda et al.

(10) Patent No.: US 7,370,142 B2
(45) Date of Patent: May 6, 2008

(54) COMMAND CONTROL METHOD IN NETWORK STORAGE SYSTEM

(75) Inventors: Yoshiko Yasuda, Tokorozawa (JP); Miho Iwanaga, Ebina (JP)

(73) Assignee: Hitachi, Ltd., Tokyo (JP)

( * ) Notice: Subject to any disclaimer, the term of this patent is extended or adjusted under 35 U.S.C. 154(b) by 282 days.

(21) Appl. No.: 10/933,293

(22) Filed: Sep. 3, 2004

(65) Prior Publication Data
US 2005/0193058 A1 Sep. 1, 2005

(30) Foreign Application Priority Data
Mar. 1, 2004 (JP) .............................. 2004-056585

(51) Int. Cl.
G06F 12/00 (2006.01)
G06F 15/16 (2006.01)

(52) U.S. Cl. ...................................... 711/112; 709/203
(58) Field of Classification Search ................ 711/112; 709/203
See application file for complete search history.

(56) References Cited

U.S. PATENT DOCUMENTS

| | | | |
|---|---|---|---|
| 5,802,345 A * | 9/1998 | Matsunami et al. ........... 703/27 |
| 6,032,161 A * | 2/2000 | Fuller ........................... 707/205 |
| 6,449,607 B1 * | 9/2002 | Tomita et al. ................... 707/3 |
| 6,574,676 B1 | 6/2003 | Megiddo |
| 6,615,312 B1 * | 9/2003 | Hamlin et al. ............... 711/112 |
| 6,665,738 B2 * | 12/2003 | Vishlitzky et al. ............. 710/4 |
| 6,763,442 B2 * | 7/2004 | Arakawa et al. ............ 711/165 |
| 6,826,630 B2 * | 11/2004 | Olds et al. ....................... 710/6 |
| 6,948,015 B2 * | 9/2005 | Ogasawara et al. ........... 710/74 |
| 2002/0065924 A1 * | 5/2002 | Barrall et al. ................ 709/227 |
| 2004/0139168 A1 * | 7/2004 | Tanaka et al. ............... 709/213 |

FOREIGN PATENT DOCUMENTS

| | | |
|---|---|---|
| JP | 5-27911 | 7/1991 |
| JP | 6-259198 | 3/1993 |

OTHER PUBLICATIONS

Vlamidir Savyak, iSCSI Review, www.digit.life.com/articles2/iscsi/, Jan. 19, 2003.*

* cited by examiner

Primary Examiner—Hyung S. Sough
Assistant Examiner—Aracelis Ruiz
(74) Attorney, Agent, or Firm—Reed Smith LLP; Stanley P. Fisher, Esq.; Juan Carlos A. Marquez, Esq.

(57) ABSTRACT

Without setting a specific function to a disk device and adding a specific function to disk access commands, a command control method for limiting an address range to be targets of the commands to be capable of optimizing an execution order of the commands, and a network storage system using it are provided. The network storage system, to which one or more disk devices are connected and which comprises a request receiving means for accepting a file access request from a client and a file system control means for translating this request into the disk access commands, is provided with the command controller for accepting the disk access commands translated by the file system control means, classifying the commands using information managed by the file system control means, and optimizing a delivery order of the commands for each of the classified commands.

6 Claims, 12 Drawing Sheets

FIG. 2

130 : Address Management Table

| CID | 0 | 1 | — 201 |
|---|---|---|---|
| MIN | 0 | 1000 | — 202 |
| MAX | 999 | 20000 | — 203 |

FIG. 3

131 : Policy Table

| CID | 0 | 1 | — 301 |
|---|---|---|---|
| CMAX | 5 | 3 | — 302 |
| TMAX | 10ms | 10ms | — 303 |
| Weight | 1 | 1 | — 304 |

FIG. 8

Example of Disk Access Command

| Sequence No. | Command Type | Address | Data Size | |
|---|---|---|---|---|
| #1 | WRITE | 640 | 8 | ~801 |
| #2 | WRITE | 10000 | 128 | ~802 |
| #3 | WRITE | 648 | 8 | ~803 |
| #4 | WRITE | 10128 | 128 | ~804 |
| #5 | WRITE | 656 | 8 | ~805 |
| #6 | WRITE | 10256 | 128 | ~806 |

COMMAND CONTROL METHOD IN NETWORK STORAGE SYSTEM

CROSS-REFERENCE TO RELATED APPLICATION

The present application claims priority from Japanese patent application No. JP 2004-056585 filed on Mar. 1, 2004, the content of which is hereby incorporated by reference into this application.

BACKGROUND OF THE INVENTION

The present invention relates to a controlling method for disk access commands to a disk device that stores data of a client and relates to a network storage system including a function of the disk access commands.

With progresses in network technologies in recent years, data to be stored in a client computer has been increased drastically. Along with this, a capacity of a direct attached storage (DAS) is getting bigger and a storage system directly connected to a network (network storage) is being introduced.

The DAS is a storage device directly connected to the client computer by using an I/O interface such as an SCSI. Data stored in the DAS can be accessed only through the client computer to which the DAS is connected directly.

Meanwhile, the network storage is a storage system connected to a network. The data can be shared between a plurality of client computers, so that the clients can manage the shared data more efficiently than the DAS. The network storage may be, for example, an SAN storage connected through a storage area network (SAN) to provide a block access, an iSCSI storage connected through an IP network, or an Infiniband, etc. to provide a block access, or a network attached storage (NAS) to provide a file access.

To hold a file in the DAS or iSCSI storage, the client computer first needs to divide a physical storage device (physical disk) into one or more logical disks (partitions) and to format them. Each partition is formatted in the form of a file system supported by an operating system (OS) of the client computer. For example, if the OS of the client computer is Windows (registered trademark), the partition is generally formatted in the form of an NTFS or FAT. If the OS of the client computer is UNIX (registered trademark), the partition is generally formatted in the form of an ext2 or ext3 file system. If the OS is supported even in the form of any other file systems, the partition can be formatted in the file form of the supported OS.

Typically, a file system holds user data as well as information used by the system in order to manage the user data. For example, when the partition is formatted by the NTFS, the OS reserves some areas in advance. In these areas, vacancy information of each disk block in the partition and addresses of the disk blocks required to write real data of the file are written. By using the information held in these areas, the OS manages the user files. Therefore, in such a file system, if a user writes data to the disk device, he needs to write also management data.

In the form of various types of file systems, such a journaling file system has been used often in recent years. The journaling file system records writing history in a log area reserved in advance whenever the OS or user writes data to a disk device. Even if system down has occurred due to a system failure, a data loss is reduced to a minimum because the system can be restarted normally by using the information recorded in the log. In the journaling file system, the OS needs to record a log as needed in response to data writing by the user so that the system can be restored to an original state even if the failure has occurred.

Typically, in such a file system, a disk block area of the disk device which stores the user data and a disk block in the disk device that stores management data to be used by the OS are managed independently of each other. Therefore, in a journaling file system in which the management data including the log is accessed frequently, a disk access to the user data and a disk access to the management data for the OS are occurred concurrently, so that accesses to discrete disk blocks are occurred often. Generally, the disk device can write data to the continual disk blocks in a short time. However, if the disk device writes to the discrete disk blocks, its access time becomes long and consequently its performance is degraded significantly.

As a method of optimizing inefficient accesses to such a disk device, there is disclosed a technology for controlling execution order of disk access commands executed on the disk device by utilizing information kept in the disk device.

For example, Patent Document 1 (Japanese Patent Application Laid-open No. 5-27911) discloses a technique of a disk device that can accept a plurality of disk access commands in a multiplexed manner to hold them in a queue buffer, wherein, with respect to a group of disk access commands queued by the disk device, a movement time of a disk head and a disk rotation time from a current position of the head to a command start sector are calculated; a waiting time is calculated from both times; and a command in which the waiting time is minimized is selected and executed, so that a command processing time is reduced.

Further, Patent Document 2 (Japanese Patent Laid-open No. 6-259198) discloses a technique for speeding up a command processing in a disk device system constituted of a plurality of disk drives. In the Patent Document 2, two kinds of command queues of a reordered queue and a standby queue are prepared so that a command to be executed may be selected from the reordered queue and a newly incoming command may be placed in the standby queue. Accordingly, in the case where the command uses a plurality of disk drives similarly to the RAID, even if one of the disk drives cannot be accessed, any other drives can be accessed, whereby disk access performance can be improved.

Furthermore, Patent Document 3 (U.S. Pat. No. 6,574,676) discloses a scheduling algorithm for changing an execution order of I/O commands queued by a disk drive and also discloses an apparatus applying thereto. By this method, in order to reduce a disk access time comprising a seek time and a movement time from a specific head to a target physical sector, a disk controller roughly calculates an expected access time of each commands with respect to a group of queued commands, and selects and executes the command having the smallest expected access time, whereby an average access time in disk I/O operations can be improved.

SUMMARY OF THE INVENTION

By the techniques described in the above-mentioned Patent Documents 1, 2, and 3, the disk device is provided with an additional function to utilize information held in the disk device, such as a disk head movement time and a disk rotation time, and control the execution order of the commands.

As described above, the capacity of the DAS or NAS increases dramatically. However, in the above-mentioned Patent Documents 1, 2, and 3, the more the capacity of a disk device increases, the wider range the disk block that is a target to be accessed by the group of reordered commands has, whereby efficiency of the reordering processing is degraded.

To solve this, a command control method is required to limit the range of addresses of commands to be reordered.

Further, in the above-mentioned Patent Documents 1, 2, and 3, since the disk device requires adding a function to control the execution order of the commands, it is difficult to apply the technique for controlling the execution order of these commands to the NAS using the general-purpose disk device.

To solve this, there is required a command control method which can optimize the execution order of the commands without adding a special function in the disk device.

Furthermore, in the above-mentioned Patent Documents 1, 2, and 3, in order to add a function to the disk device, if a plurality of disks are present, optimization cannot be performed on a wide range covering the plurality of disk devices, whereby processing efficiency of the commands is degraded.

To solve this, when the plurality of disk devices are present, there is a command control method which can optimize the execution order of the commands, which covers the plurality of disk devices.

A first object of the present invention is to provide a command control method that can control an address range to be a target of disk access commands in order to optimize the execution order of the disk access commands.

A second object of the present invention is to provide a command control method that can optimize the execution order of the disk access commands without adding a special function to the disk device.

A third object of the present invention is to provide a command control method that can optimize the execution order of the disk access commands, which covers the plurality of disk devices, when the plurality of disk devices are present.

The first object of the present invention can be achieved by providing a network storage system, to which one or more disk devices are connected and which comprises a request receiving means for receiving a file access request from a client and a file system control means for translating this request into the disk access commands, wherein the network storage system is provided with a command controller for accepting the disk access commands translated by the file system control means, classifying the commands using information managed by the file system control means, and optimizing a delivery order of the commands for each of the classified commands.

The second object of the present invention can be achieved, without embedding special information into the disk access commands created by the file system control means in order to classify the disk access commands, by providing an address management table for recording allocation information managed by the file system control means, a policy table for recording information of controlling how to deliver the classified disk access commands, and a means for registering these information items.

The third object of the present invention can be achieved by further providing, in addition to the means for achieving the first and second objects, a mapping table and a mapping means for recording a correlation between target address information of the disk access commands and information of reallocation-destination addresses to the command controller of the network storage system to which a plurality of disk devices is connected.

In the network storage system to which one or more disk device is connected, the request receiving means receives a file access request from a client, and the file system control means is translated it into file access commands, and, by utilizing information managed by the file system control means, the command controller classifies the disk access commands and changes the delivery order for each classified command, so that the delivery order of the commands is optimized efficiently by limiting an address range of the access targets of the commands.

Further, in the network storage system to which one or more disk device is connected, the allocation information managed by the file system control means is recorded in the address management table provided to the command controller, and further information for controlling the delivery order of the commands is recorded in the policy table provided to the command controller, so that the delivery order of the commands can be optimized by classifying the disk access commands without adding special information to the access commands delivered from the file system control means.

Furthermore, in the network storage system to which one or more disk device is connected, a correlation required to change access target address information of a specific disk access command into another address information is recorded in the mapping table, and the command selection means in the command controller reallocates the addresses for the disk access commands by using the mapping table, so that the delivery order of the commands can be optimized efficiency over a wide range.

In the network storage system to which one or more disk device is connected, the command controller can classify the disk access commands by utilizing the information managed by the file access control means and change the delivery order for each classified disk access commands. It is thus possible to optimize the delivery order of the commands efficiently by limiting the address range. As a result, a disk access time can be reduced.

Further, in the network storage system to which one or more disk device is connected, the command controller holds the information managed by the file access control means, so that this information can be utilized by the command controller. It is thus possible to classify the disk access commands in the command controller without adding special information to these disk access commands. As a result, a general-purpose disk device can be used.

Furthermore, in the network storage system to which one or more disk device is connected, the command controller can be provided with the mapping table for changing addresses to be access targets of the disk access commands, thereby optimizing the delivery order of the commands over the plurality of disk devices.

BRIEF DESCRIPTION OF THE DRAWINGS

FIG. 2 is a diagram showing a configuration of an address management table in the above embodiment.

FIG. 3 is a diagram showing a configuration of a policy table in the above embodiment.

FIG. 8 is a diagram showing an example of a disk access command in the above embodiment.

DESCRIPTION OF THE PREFERRED EMBODIMENTS

Typical Embodiment

Figure 1:
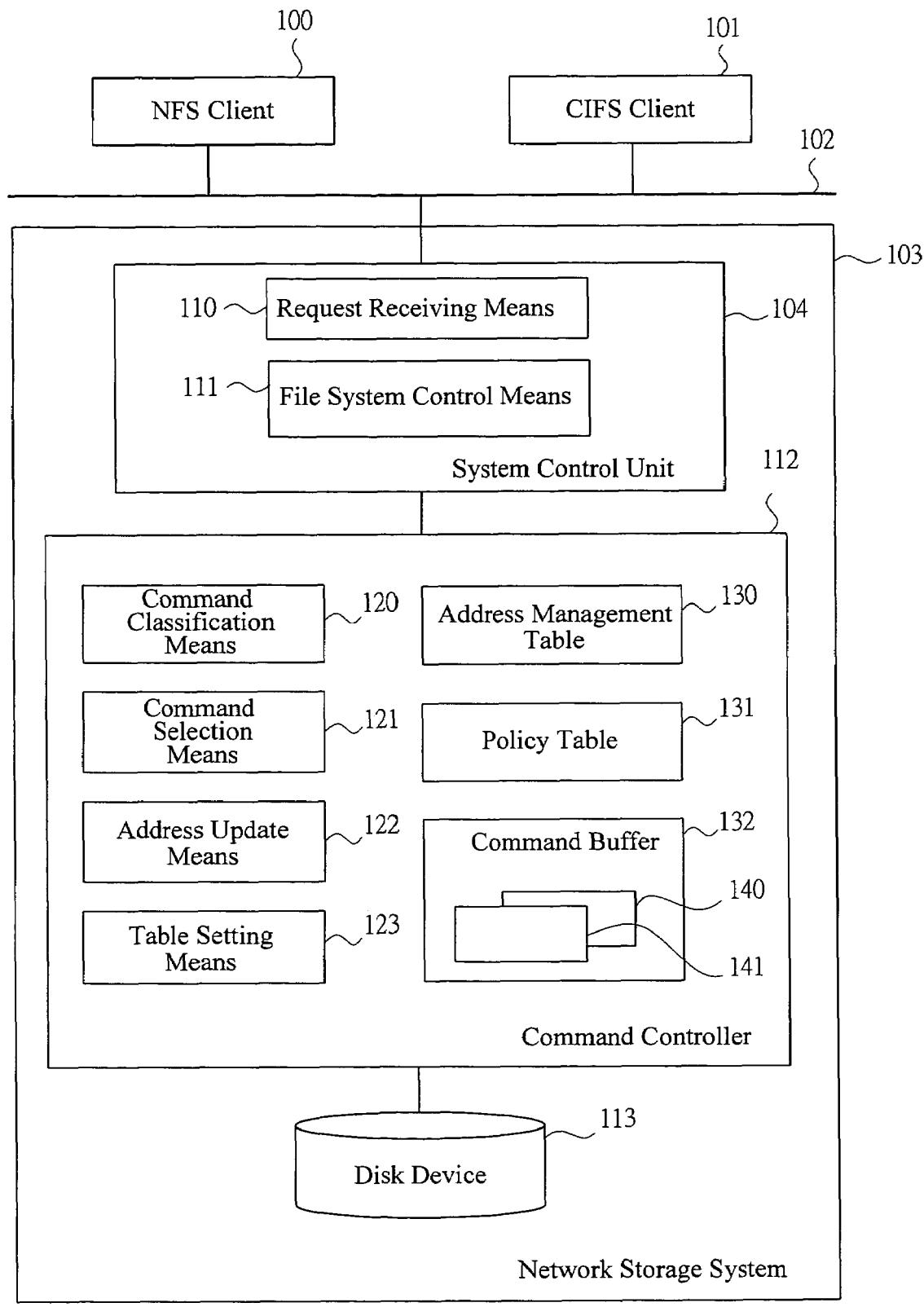
FIG. 1 is a block diagram showing an overall configuration of a network storage system according to an embodiment of the present invention.

FIG. 1 shows an overall configuration of a network storage system according to an embodiment of the present invention. An information processing system including the network storage system comprises clients 100 and 101, a network 102, and a network storage system 103. The following will describe in detail a method for optimizing order of commands delivered to a disk device when the clients 100 and 101 share a file by using the network storage system 103 in the present embodiment.

The clients 100 and 101 access the network storage system 103 via a network file system (NFS) or common Internet file system (CIFS) client program and the network 102. Herein, although the clients are exemplified as an NFS client and a CIFS client only, any other standard file access protocol may be utilized. As this other file access protocol, an Apple file protocol (AFP) or a NetWare core protocols (NCP), etc. may be available.

The network 102 may be a local area network (LAN) or a wide area network (WAN) as far as it is an IP network.

The network storage system 103 is constituted of a system control unit 104, a command controller 112, and a disk device 113.

A standard disk access interface is send and received between the system control unit 104 and the command controller 112 and between the command controller 112 and the disk device 113. Specifically, an SCSI interface is used to send and receive SCSI commands.

The system control unit 104 includes a request receiving means 110 and a file system control means 111. The system control unit 104 may be a dedicated device, a general-purpose server, a workstation, or a personal computer. It may be any standard computer as far as it can install the OS therein. In the embodiment of the present invention, it is assumed that the request receiving means 110 and the file system control means 111 are built in the OS. The request receiving means 110 and the file system control means 111 will be detailed later.

The disk device 113 has a command interface for receiving disk access commands and reads and writes data through it. This interface may be any standard one through which the disk can be accessed. As the standard interface for disk access, the SCSI interface is available, for example. In the embodiment of the present invention, the disk device 113 has the SCSI interface. To perform reading and writing operations to the disk device 113, an SCSI command is used. The SCSI command is composed of a command portion indicating an instruction of a reading/writing operation etc. and an address portion indicating a position of the disk device which is a target accessed by this command. The address portion contains an LUN and a logical block address (LBA). The disk device analyzes a logical block address of the SCSI command transferred from a host and translates the logical block address into a physical address (cylinder, sector, or track) of the disk, thus reading and writing data.

The request receiving means 110 processes mount requests delivered from the clients 100 and 101. Further, the request receiving means 110 receives file access requests issued by the clients 100 and 101 and transfers the file access requests to the file access control means 111. The term "mount" means a processing by which a file system of the network storage system accessed through the network is made one portion of a file system of a client computer. For example, in the case where the client is a CIFS client, a mounting processing is to assign the file system of the network storage system 103 to a network drive of the client computer. By mount processing, the client can access the storage devices decentralized on the network as if they are a local file system of the client. In the present embodiment, the clients 100 and 101 access the request receiving means 110 by using the above-mentioned NFS protocol or CIFS protocol. A file access by use of the NFS protocol or the CIFS protocol in the request receiving means 110 can be realized by using a well known technology and so is not described in detail.

The file system control means 111 analyzes the file access request having been received from the request receiving means 110 and translates it into a disk access command that can be interpreted by the disk device 113. The present invention employs the SCSI interface, so that the file system control means 111 translates the file access request into the SCSI command. Further, the file system control means 111 performs a formatting processing on the disk device 113 by the file system supported by the OS installed in the network storage system. These processing items are well known and so not described in detail.

The UNIX (registered trademark)-based OSs include Solaris of Sun Microsystems Inc., AIX of International Business Machines Corporation, HP-UX of Hewlett-Packard Company, Linux, or FreeBSD, etc. Each OS supports a plurality of file systems. The UNIX-based OS supports such file systems as ext2 and ext3. Further, the Windows (registered trademark)-based OS supports such file systems as FAT and NTFS. There are such other file systems as XFS, JFS, and ReiserFS. By formatting the disk device in accordance with any of these file systems, files can be read from and written to the disk device 113.

The command controller 112 receives a plurality of disk access commands transferred from the system control unit 104 and classifies them by utilizing file allocation information managed by the file system control means 111 and efficiently transfers a group of disk access commands to the disk device 113 in accordance with categories. The command controller 112, the classification method, and a selection method are features of the present invention. A command transferred from the system control unit 104 is directly issued by an application run on the system control unit 104 or transferred from the file system control means 111 as described above. Further, in the embodiment of the present invention, it is assumed that the disk access command is an SCSI command.

The command controller 112 is composed of a command classification means 120, a command selection means 121, address update means 122, a table setting means 123, an address management table 130, a policy table 131, and a command buffer 132.

The command classification means 120 receives disk access commands from the system control unit 104 and classifies these disk access commands in accordance with contents of the address management table 130. Details of the command classification means 120 will be described later. Details of the address management table 130 will also be described later.

The command selection means 121 selects, in accordance with contents of the policy table 131, a specific disk access command from the group of disk access commands held in the command buffer 132, and delivers it to the disk device 113. Details of the policy table 131 and those of the command selection means 121 will be described later.

At constant time interval, the address update means 122 investigates the file allocation information managed by the file system control means 111 and updates the contents of the address management table 130. Details of the address update means 122 will be described later.

The table setting means 123 initializes the tables. Specifically, classification target items of the command classification means 120 are set to the address management table 130. Further, the table setting means 123 sets a policy to the policy table 131. A special command sequence may be prepared so that classification items and the policy can be automatically set when the file system control means 111 formats the disk device or an administrator may be able to set a value to the address management table 130 from a console or a Web server. In the case where the value is set from the Web server, for example, a Web server such as Apache is installed in the command controller 112 and thereby the client may use a Web browser to set classification items. Further, a value to be set to the policy table 131 may be adjusted in accordance with performance or use of the disk device 113.

The address management table 130 utilizes the allocation information managed by the file system control means 111 in the system control unit 104, thereby recording a correlation between specific files and a logical block address contained in the disk access command. The address management table 130 is referenced by the command classification means 120 and updated by the address update means 122. To store each file in the disk device 113, the file system control means 111 manages allocation information that indicates logical block address allocated to each file data. Therefore, this allocation information is recorded in the address management table 130. For example, in the case of classifying a lot of files into two categories of user files and system files used by the system, there are recorded a range of logical block addresses in which the user files are allocated and a range of logical block addresses in which system files are allocated. FIG. 2 shows a configuration of the address management table 130. Row 201 indicates a command classification identifier. The command classification identifier is a unique value to each classification target item. In this case, the term "CID=0" indicates a command for accessing the user file and "CID=1" indicates a command for accessing the system files. Row 202 indicates the minimum value MIN of logical block addresses that may possibly be accessed by a disk access command belonging to the command classification identifier. Row 203 indicates the maximum value MAX of logical block addresses that may possibly be accessed by a disk access command belonging to the command classification identifier. In an example of FIG. 2, commands classified to "CID=0" access a range of addresses 0 to 999 and commands classified to "CID=1" access a range of addresses 1000 to 20000. The embodiment of the present invention has provided two command classification identifiers to set two command classification items and has recorded in the table the files as classified into a user file group and a system file group. However, the user file group may be classified further to record a range of logical block addresses at which files of a specific user are allocated. Alternatively, a range of logical block addresses at which specific system files such as log files are allocated may be recorded. Furthermore, a correlation between a high-priority file group and a range of logical block addresses at which these files are allocated may be recorded. Further, in the case where there are only two items to be classified similarly to the embodiment of the present invention, only either one of the logical block address ranges may be recorded. Further, although the embodiment of the present invention has used one set of minimum and maximum values to indicates the address range to which each command classification identifier belongs, a plurality of sets of minimum and maximum values may be recorded for each of the command classification identifiers. Thus, by utilizing the allocation information managed by the file system control means 111, the command controller 112 can identify the access target file of the disk access command based on the logical block address contained in this disk access command. Methods of registering and updating the address management table 130 will be described later.

The policy table 131 is referenced by the command selection means 121 and set by the table setting means 123. The policy table 131 records a delivery unit in which a disk access command group classified is delivered to the disk device. The delivery unit may be a time or number of pieces. FIG. 3 shows a configuration of the policy table 131. In the policy table 131, a command selection policy is set for each command classification identifier. The command selection policy in the embodiment of the present invention has items of a maximum delivery unit CMAX, a maximum elapsed time TMAX, and weight. Row 302 indicates the maximum delivery unit CMAX. In FIG. 3, if "CID=0", at the most five commands are delivered consecutively. If "CID=1", at the most three commands are delivered consecutively. Row 303 indicates the maximum elapsed time TMAX. When the time of at the most "TAMX" elapses after a specific command buffer is selected, a new command buffer is selected again. Row 304 indicates the weight. It indicates how a plurality of command buffers is selected. In FIG. 3, the weight is set one to one, so that the command buffer corresponding to "CID=0" and that corresponding to "CID=1" are selected evenly. Although the embodiment of the present invention has selected the policy for each command classification identifier CID, the same policy may be set for a plurality of command classification identifiers. Further, although the present invention has set the three policies, any other policy may be set. The policy may be set in such a manner as to be adapted to performance of the disk device or properties of an application operating in the network storage system.

The command buffer 132 holds disk access commands classified by the command classification means 120. A plurality of planes of the command buffer 132 is prepared so that each of the planes may correspond to each of the command classification identifiers, and registers commands corresponding to the command classification identifiers. In the embodiment of the present invention, if the commands classified by the command classification means 120 belong to the command classification identifier "CID=0", they are registered to a command buffer 140 while if they belong to the command classification identifier "CID=1", they are registered to a command buffer 141. Although the embodiment of the present invention has prepared a plurality of planes of the command buffer 132 similarly to the command buffers 140 and 141, it is unnecessary to prepare a plurality of planes of the buffer. Any method can be employed as far as the command classification means 120 can identify the disk access commands.

Figure 4:
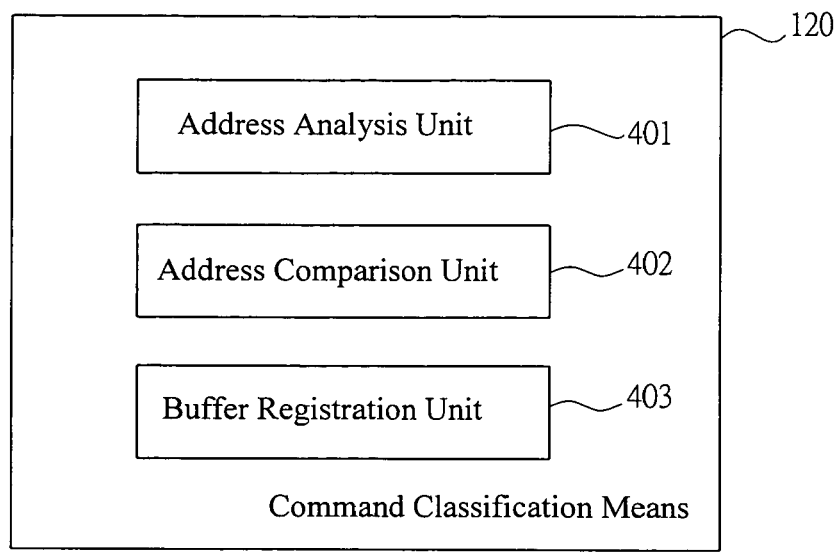
FIG. 4 is a diagram showing a configuration of command classification means in the above embodiment.

The following will describe in detail the command classification means 120 with reference to FIG. 4. The command classification means 120 is composed of an address analysis unit 401, an address comparison unit 402, and a buffer registration unit 403. The address analysis unit 401 analyzes a disk access command transferred from the system control unit 104 and extracts address information therefrom. More specifically, it extracts a logical block address. The address comparison unit 402 compares a logical block address extracted by the address analysis unit 401 and a logical block address registered in the address management table 130, and identifies a command classification identifier. The buffer registration unit 403 registers a command to a command buffer that corresponds to the command classification identifier identified by the address comparison unit 402.

Figure 5:
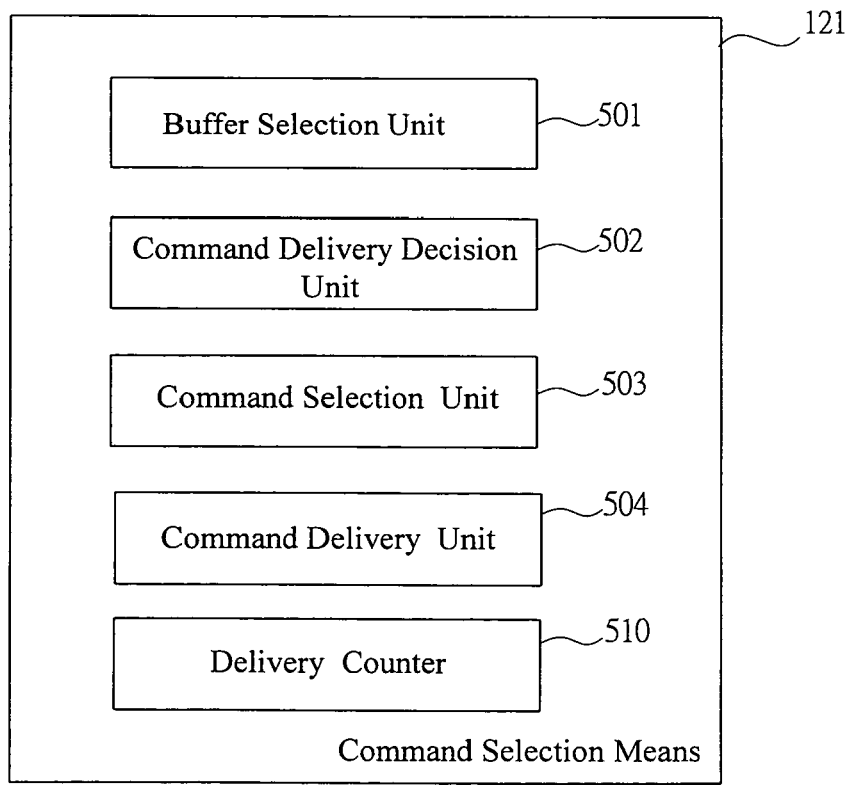
FIG. 5 is a diagram showing a configuration of command selection means in the above embodiment.

The following will describe in detail the command selection means 121 with reference to FIG. 5. The command selection means 121 is composed of a buffer selection unit 501, a command delivery decision unit 502, a command selection unit 503, a command delivery unit 504, and a delivery counter 510.

The buffer selection unit 501 selects either one of the planes of the command buffer 132 by referencing the policy table 131. The command delivery decision unit 502 determines: whether the selected command buffer is empty; whether a constant time has elapsed; or whether a value CNT of the delivery counter 510 has reached a Cmax set to the policy table 131. The delivery counter 510 will be described later. The command selection unit 503 selects commands from commands kept in the command buffer selected by the buffer selection unit 501. For example, the commands are selected in such an order that logical block addresses can be continual. Alternatively, if there is a plurality of write commands for the same logical block address, optimization may possibly be performed so that only the subsequent commands would be transferred to the disk device. The command delivery unit 504 delivers, to the disk device, the commands selected by the command selection unit 503.

The delivery counter 510 manages the number of commands delivered to the disk device after the command buffer is selected. This counter is initialized when the command buffer is selected, and is incremented each time the command registered in the command buffer is delivered to the disk device. In the case where many commands are registered in the command buffer, it is possible to deliver, consecutively to the disk device, as many as the commands registered to the CMAX of the policy table 131 can be delivered.

The following will describe a command control processing performed by the command controller 112. The command control processing is composed of a command classification processing and a command selection processing. The command classification processing and the command selection processing operate in parallel.

Figure 6:
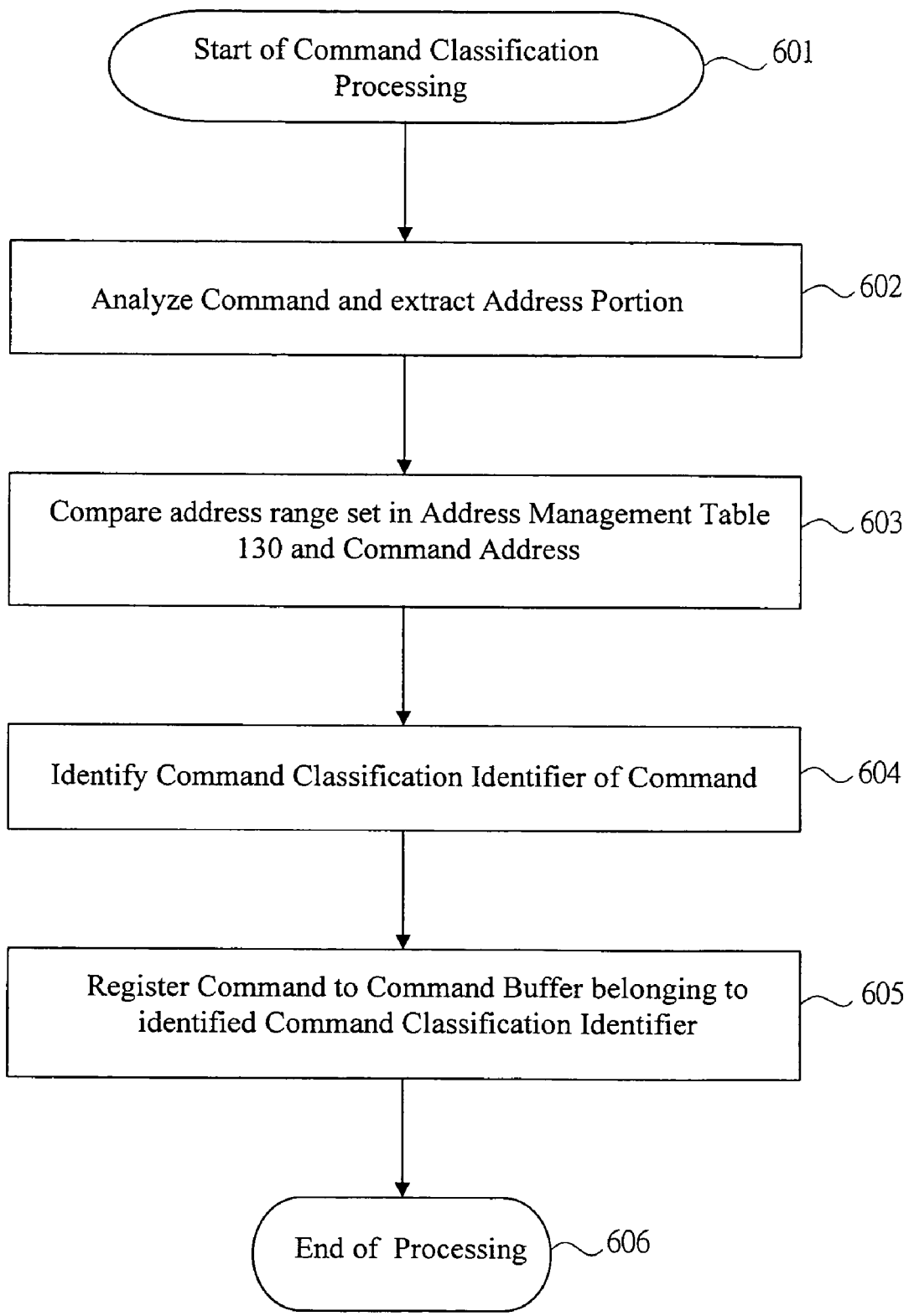
FIG. 6 is a flowchart showing a processing by the command classification means in the above embodiment.
Figure 7:
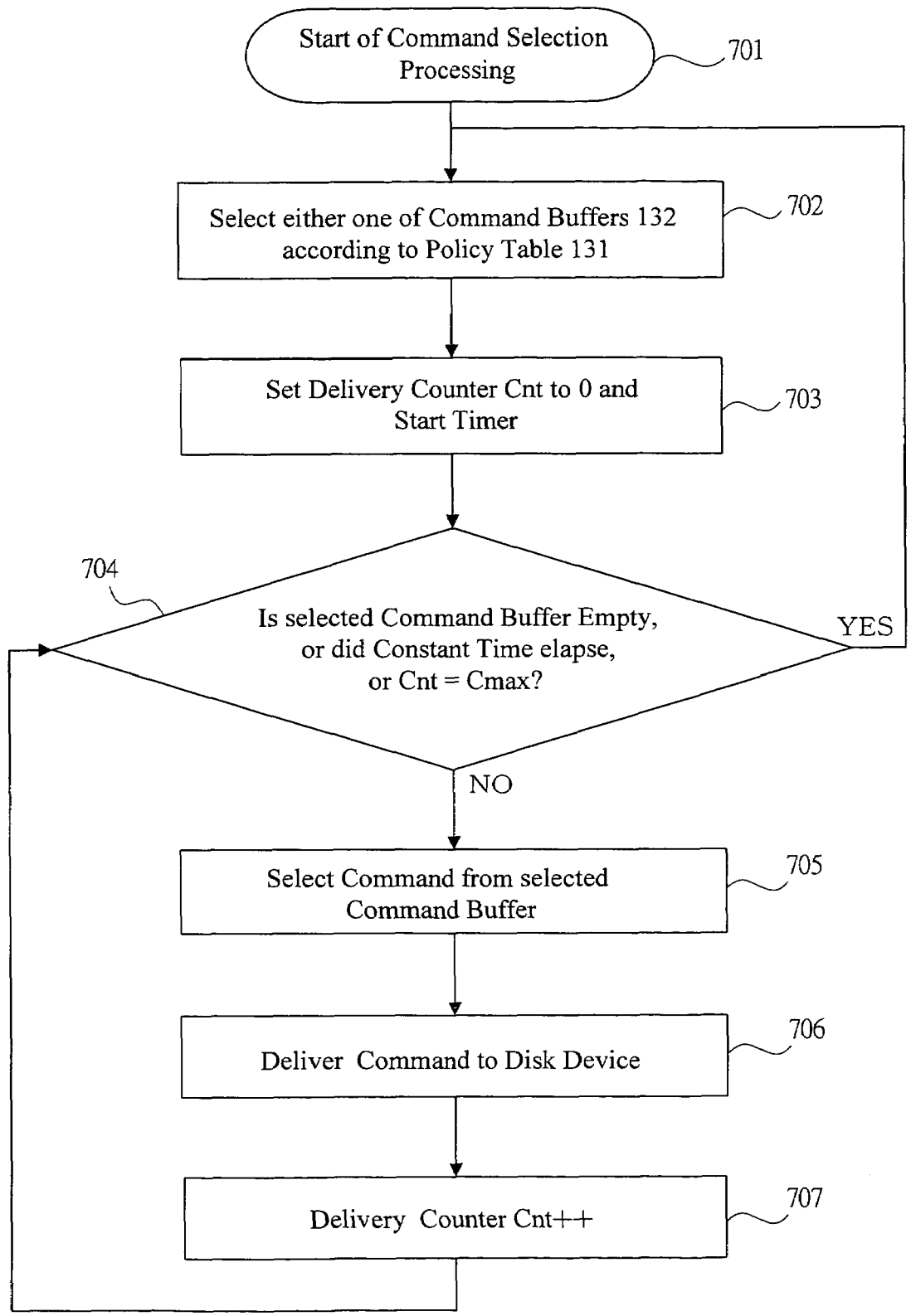
FIG. 7 is a flowchart showing a processing by the command selection means in the above embodiment.

FIG. 6 shows a flowchart of the command classification processing. The command controller 112 invokes the command classification means 120 when it has received a disk access command from the system control unit 104. At process 602, it analyzes the disk access command transferred from the system control unit 104 and extracts address information, which is a logical block address in the embodiment of the present invention. Next, at process 603, an address range set to the address management table 130 and the extracted logical block address are compared. At process 604, the command classification identifier of the disk access command is specified. Finally, at process 605, the disk access command is recorded in a command buffer that corresponds to the command classification identifier of the command buffer 132. If "CID=0", it is recorded in the command buffer 140 and, if "CID=1", it is recorded in the command buffer 141. The command selection means 121 is resident in the command controller 112. FIG. 7 shows a flowchart of a command selection processing. At process 702, either one of the planes of the command buffer 132 is selected in accordance with the contents which are set to the policy table 131. For example, in the policy table 131 shown in FIG. 3, since weighting is determined so that the command buffers can be selected evenly, the command buffer 140 belonging to the "CID=0" is first selected. At process 703, the delivery counter 501 for indicating how many commands have been delivered from the buffer is set to 0. Then, a timer for measuring an elapsed time is started. At process 704, it is determined: whether the selected command buffer is empty; whether a constant time has elapsed; or whether the value CNT of the delivery counter 510 has reached the Cmax. If any one of these conditions is taken, a buffer is again selected by returning to the process 702.

If none of them is taken, a disk access command is selected from the buffer selected at process 705. The simplest selection method is to select the command in the form of the FIFO. Alternatively, the logical block addresses to be access targets of the commands may be selected so as to becomes continued by interchanging their order.

At process 706, the disk access commands are delivered to the disk device. Finally, at process 707, the value Cnt of the delivery counter 510 is incremented to return to the process 704.

The following will describe a processing for updating the address management table 130 in the address update means 122. Immediately after the disk device 113 is formatted, there are a small number of files to be managed by the system and there is no user file created. However, as the user continues to use the network storage system 103, the number of user files held in the disk device 113 increases and the numbers of system files for managing the user files and the disk areas for those system files increase accordingly. Therefore, the range of the logical block addresses recorded in the address management table is changed. The table update means 122 updates the contents recorded in the address management table 130 at constant time interval elapses.

Three updating methods may be considered. A first method is inquiring of the file system control means 111. This method is used when the file system control means 111 does not know where information to be managed exists. An agent is prepared for inquiring of each of the file system control means 111 and the address update means 122. For each constant time interval, the address update means 122 inquires of the file system control means 111 about the management information and, as a result of the inquiry, the file system control means 111 notifies the address update means 122 of a correlation between the current files and the address. By utilizing this information, the address update means 122 updates the contents recorded in the address management table 130. A second method is used when the file system control means 111 knows beforehand a logical block address at which the management information is to be placed. Each time the constant time interval elapses, the address update means 122 directly accesses the disk area at which the file system control means 111 allocates the management information, thereby reading data. A third method is that a function is added to the file system control means 111 and each time file allocation information managed by the file system control means 111 changes, such a change may be posted to the address update means 122. Besides, the administrator may access the file system control means 111 to investigate an address range and may set the investigated result manually to the address management table 130. Any method can be employed as far as the address update means 122 can know that the range of logical block addresses managed by the file system control means 111 has changed.

The following will describe an overall flow of the command control processing in the present embodiment with reference to FIGS. 1, 2, 3, 6, and 7. The address management table 130, the policy table 131, the mapping table, and the command buffer 132 are initialized beforehand when the network storage system 103 is configured. To the address management table 130, two kinds of areas, that is, an area to be used by the system and an area to be used by the user, are set as initial values and, after the disk device 113 is formatted by the file system control means 111, an address range corresponding to the command classification identifier may be set beforehand. The policy shown in FIG. 3 is set beforehand to the policy table 131. These information items are set to the address management table 130 through the table setting means 123 when the network storage system 103 is configured.

Such a situation is assumed that several files are written to the clients 100 and 101 shown in FIG. 1. When a file is written to the clients 100 and 101, the request receiving means 110 receives a file access request and the file system control means 111 converts the request into a disk access command and delivers the converted request to the command controller 112. FIG. 8 shows an example of disk access commands delivered from the file system control means 111. A disk access command contains a disk access instruction, a logical block address (in a decimal system), and a data size. Here, such an example is described that six disk access commands have been transferred from the file system control means 111 consecutively.

The command classification means 120 receives the disk access commands delivered from the file system control means 111 in the sequential order from a first one (801) and starts a command classification processing. The following will describe the command classification processing with reference to FIG. 6. In the command classification processing, at process 602, the first disk access command 801 is analyzed to extract a logical block address "640" of the command 801. At process 603, the address set to the address management table 130 and the extracted address are compared. Since the address of the command is "640", the command classification identifier becomes "CID=0". Next, at process 605, this command is recorded in the command buffer 140 that belongs to "CID=0". The second and subsequent commands are also processed similarly. As a result, the commands #1 (command 801), #3 (command 803), and #5 (command 805) are recorded in the command buffer 140 while the commands #2 (command 802), #4 (command 804), and #6 (command 806) are recorded in the command buffer 141.

First, at process 702 of FIG. 7, the command selection means 121 selects the command buffer 140 in which the commands with "CID=0" are held. At process 703, the delivery counter 510 is initialized and concurrently there is started the timer for measuring the elapsed time during which the buffer command is selected. At process 704, the conditions are evaluated. Decision of the conditions is "NO" because the value of the timer is 0 and the command buffer 140 is not empty and the value of the delivery counter 510 is less than the value of CMAX. Next, at process 705, one of the commands recorded in the command buffer 140 is selected. In the case where the command is selected in the form of the FIFO, the command #1 (command 801) is selected. At process 706, the command 801 is delivered to the disk device and the value of the delivery counter 510 is incremented by one to return to process 704.

At process 704, since the command is still left in the selected command buffer 140, decision of the conditions is "NO" again, so that the command #3 (command 803) is selected at process 705. The command 803 is delivered to the disk device at process 706 and, at process 707, the value of the delivery counter 510 is incremented by two.

Similarly, the command #5 (command 805) is delivered to the disk device and, at process 704, the command buffer is emptied. As a result, decision of the conditions is "YES", so that the process 702 is performed.

At process 702, in the weighting of the policy table 131 shown in FIG. 3, since the command buffers are selected evenly, the command buffer 141 is selected next. At process 703, the value of the delivery counter 510 is set to zero and the timer for measuring an elapsed time is started. At process 704, similarly to the above description, the first conditions are not taken, so that decision of the conditions is "NO" and, at process 705, the command #2 (command 802) is selected. At process 706, the command is delivered to the disk device and the value of the delivery counter 510 is incremented by one. Then, the next process is returned to process 704 for determining the conditions.

Similarly, the commands #4 (command 804) and #6 (command 806) are delivered to the disk device 113, thereby becoming waiting for the processing. As a result of these processing items, the data can be written to the disk device in the sequential order of commands 1 (command 801), #3 (command 803), #5 (command 805), #2 (command 802), #4 (command 804), and #6 (command 806), whereby the disk access can be made efficiently.

First Modified Example of the Embodiment

The above typical embodiment has been described with reference to the method of controlling the delivery order of the disk access commands, by using the address information managed by the file system control means in the case of utilizing one disk device.

In the case where a journaling file system is used, a writing operation to a specific file managed by the system, for example, a log file, occurs frequently. In the typical embodiment, by classifying accesses to a disk area in which information managed by the system is held and accesses to a disk area in which a user file is held, access locality is enhanced and the access to the disk device can be made efficiently. However, in the case of the accesses to the same disk device, the writing operations are made sequential. Therefore, in the first modified example, by writing only a log file to another disk, the disk device can be used with better efficiency.

Figure 9:
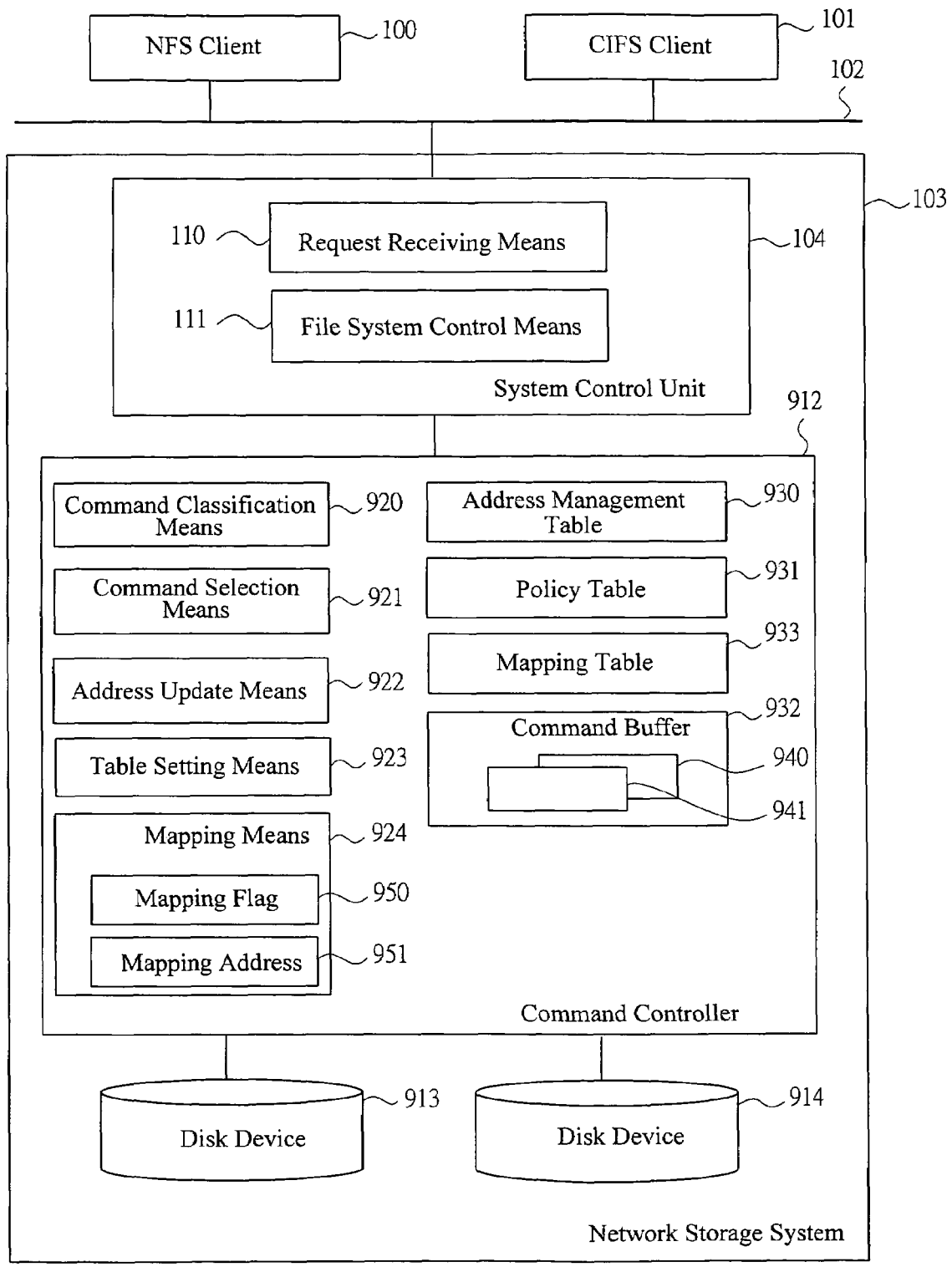
FIG. 9 is a block diagram showing an overall configuration of a network storage system according to a first modified example of the typical embodiment.

FIG. 9 shows an overall configuration of a network storage system according to the first modified example. The first modified example is different from the typical embodiment in that the network storage system 103 comprises a plurality of disk devices (disk devices 913 and 914) and a command controller 912 is provided with a mapping table 933 and a mapping means 924. Further, a processing of a command selection means 921 is also different from that of the typical embodiment. Furthermore, this modified example is different from the typical embodiment in that since the network storage system 103 is provided with the plurality of disk devices, an address management table 930 is provided in such a manner as to correspond to device identifiers which are used to identify the plurality of disk devices. When a command selection policy is changed to correspond to the disk device, a policy table 931 can be provided corresponding to the device identifier. Alternatively, for each combination of the device identifier and the command classification identifier CID, a value of the address management table or the policy table 931 may be set.

A mapping table 933 is used in the case where only a specific file is allocated to another disk device or where data to be accessed by a disk access command is reallocated to another address. The case of reallocating the data to be accessed by the disk access command to another logical block address corresponds to the case of eliminating fragmentation having occurred at the disk device. The mapping table 933 records a correlation between an original address and a reallocation-destination address. The address includes a device identifier and a logical block address. The device identifier is information for identifying the plurality of disk devices. In the first modified embodiment, the case where two disk devices are used has been described. However, in the case where one disk device is used, it is not necessary to record the device identifiers. In the case where three or more disk devices are used, identifiers may be recorded in accordance with the number of the devices.

The mapping means 924 includes a mapping flag 950 and a mapping address 951. When a disk address to be a access target by the disk access command is changed to another address, the mapping means 924 sets the mapping flag 950 to one and sets the mapping address 951 or the mapping table 933 to a value. The mapping address 951 is used to change, to another address, the disk address at which a specific file is stored or to shift, to another address, all files belonging to a specific category. The mapping table 933 is used to flexibly change a reallocation-destination address according to the usage of the disk address. For example, in the case of reallocating all of the disk access commands which access a specific file, a reallocation-destination initial logical block address and a device identifier can be set to the mapping address 951.

The mapping flag 950 and the mapping address 951 may be set beforehand at the time of configuring the network storage system or may be set by an administrator using a client computer or console after utilization. In the case of setting them beforehand when the network storage system is configured, they may be selected and set as an option menu at the time when a file system control means 111 formats the disk devices 913 and 914, whereby when the administrator has selected the option menu, values may be set to the mapping flag 950 and the mapping address 951 of the command controller 912. In this case, they may be set using a unique interface or Web interface. Any method may be employed as far as it permits the client computer to set the command controller 912 to a value.

To set the mapping table 933 to a value by using the mapping means 924, it is necessary to know a use situation of the reallocation-destination disk device. The disk device usage can be known by inquiring of the file system control means 111 on an on-demand basis or at a constant time interval or by directly reading a disk area that manages the disk device usage. The file system control means 111 typically manages vacancy information of the disk devices 913 and 914 over specific address ranges of the disk devices 913 and 914. Therefore, by reading the data in that address range, the vacancy information of the respective disk devices can be known. In the case of reallocating an address to be a target access of the accepted disk access command, the mapping means 924 first investigates the vacancy information of the reallocation-destination disk device. The mapping table 933 may be set in any manner as far as it can manage information of the original address and information of the reallocation-destination address. A reallocation policy may be set so that disk access target addresses of a writing disk access command belonging to a specific category may be continual. Or, it may set the mapping table 933 to a value so that an access history of disk access commands is recorded beforehand to check whether each access to the separate disk areas occurs in a specific pattern and, if such is the case, the address information can be changed.

Figure 10:
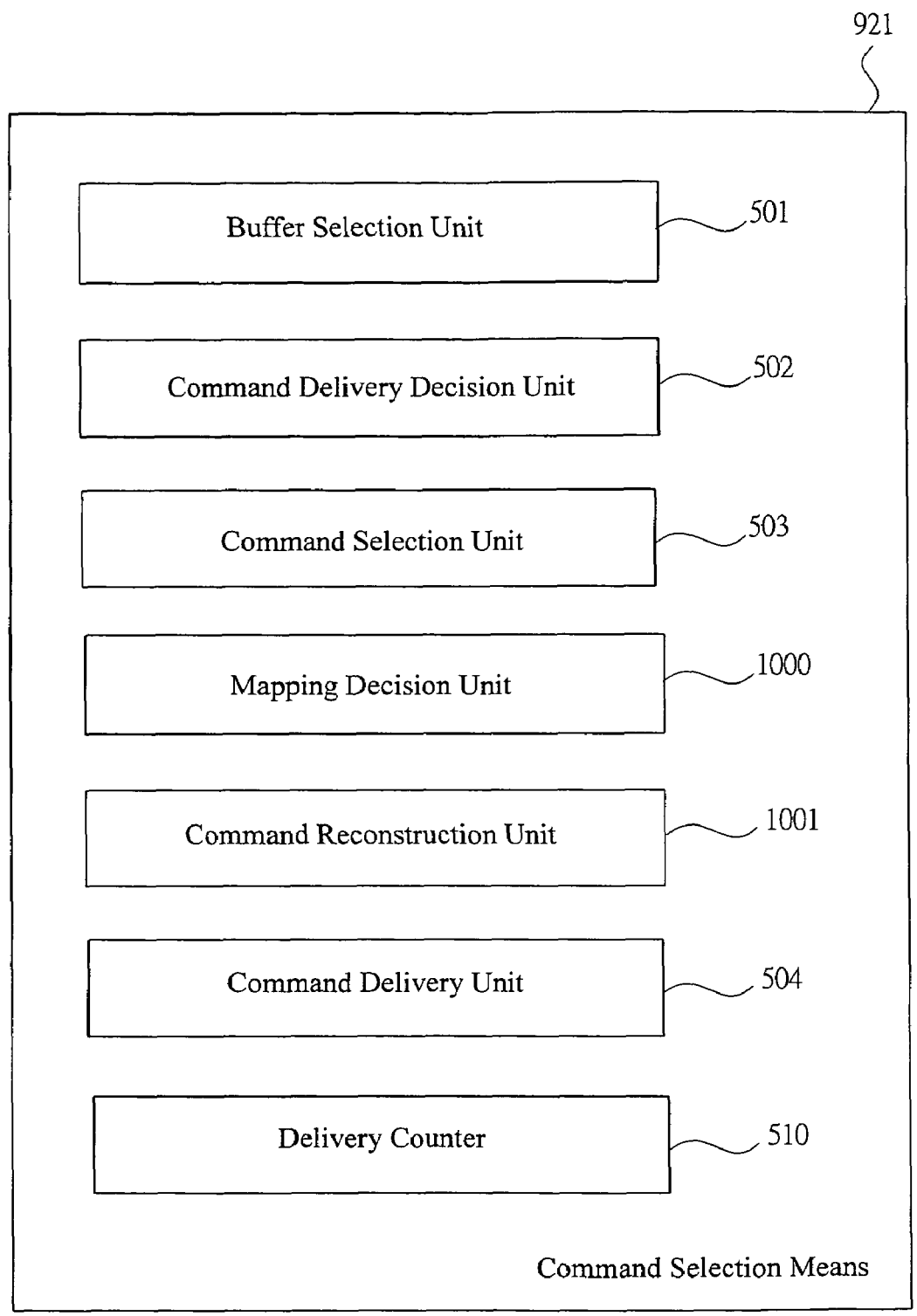
FIG. 10 shows a configuration of command selection means of the first modified example.

FIG. 10 shows a configuration of the command selection means in the first modified example. In the first modified example, the command selection means 921 includes a mapping decision unit 1000 and a command reconstruction unit 1001 in addition to components of the command selection means 121 in the typical embodiment.

The mapping decision unit 1000 checks the mapping flag to decide whether a change in mapping is set. Further, if the mapping change is set, that is, if the mapping flag 950 is set to one, the command reconstruction unit 1001 converts the access target address information of the commands into the reallocation-destination address according to contents of the mapping address 951 or the mapping table 933, whereby the commands are reconstructed.

Figure 11:
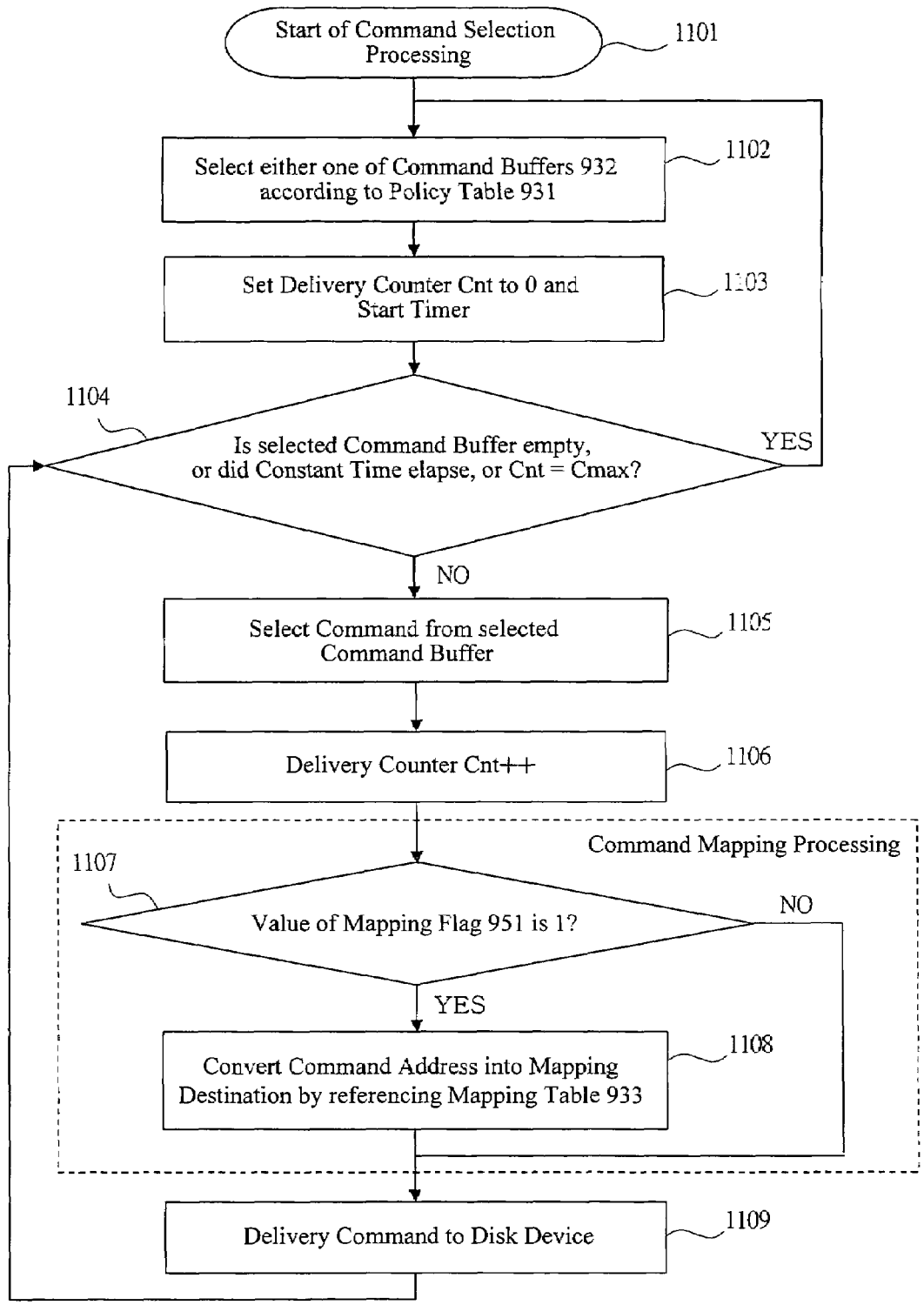
FIG. 11 is a flowchart showing a processing of the command selection means of the first modified example.

FIG. 11 shows a flow of a command selection processing in the command selection means 921. The following will describe an example of embedding a mapping processing into a command selection processing. Processing items of processes 1102, 1103, 1104, 1105, and 1106 are tantamount to those of processes 702, 703, 704, 705, and 707 in the command selection processing flow of FIG. 7 in the typical embodiment, respectively. When a command is selected from a selected command buffer at process 1105, whether a target address of the command is to be changed is determined at process 1107. At this time, if the mapping change information is set to the mapping table 933, process 1108 is performed. Whether the mapping change information is set can be decided by checking a value of the mapping flag 950. If a value of the mapping flag is zero as a result of the decision of conditions, the process 1108 is not performed and the command is delivered, as it is, to a disk device to be a access target at process 1109. If the mapping flag is set to one, the address information of the access target of the command is converted into a mapping-destination address at process 1108 to reconstruct the command. Then, at process 1109, the command is delivered to the disk device.

Second Modified Example of the Embodiment

The above typical embodiment has been described with reference to the command controller that controls the SCSI command by using the SCSI interface between the file system control means 111 and the disk device 113. The second modified example of the embodiment is different from the typical embodiment and the first modified example in that the iSCSI interface is employed between the file system control means and the command controller.

Figure 12:
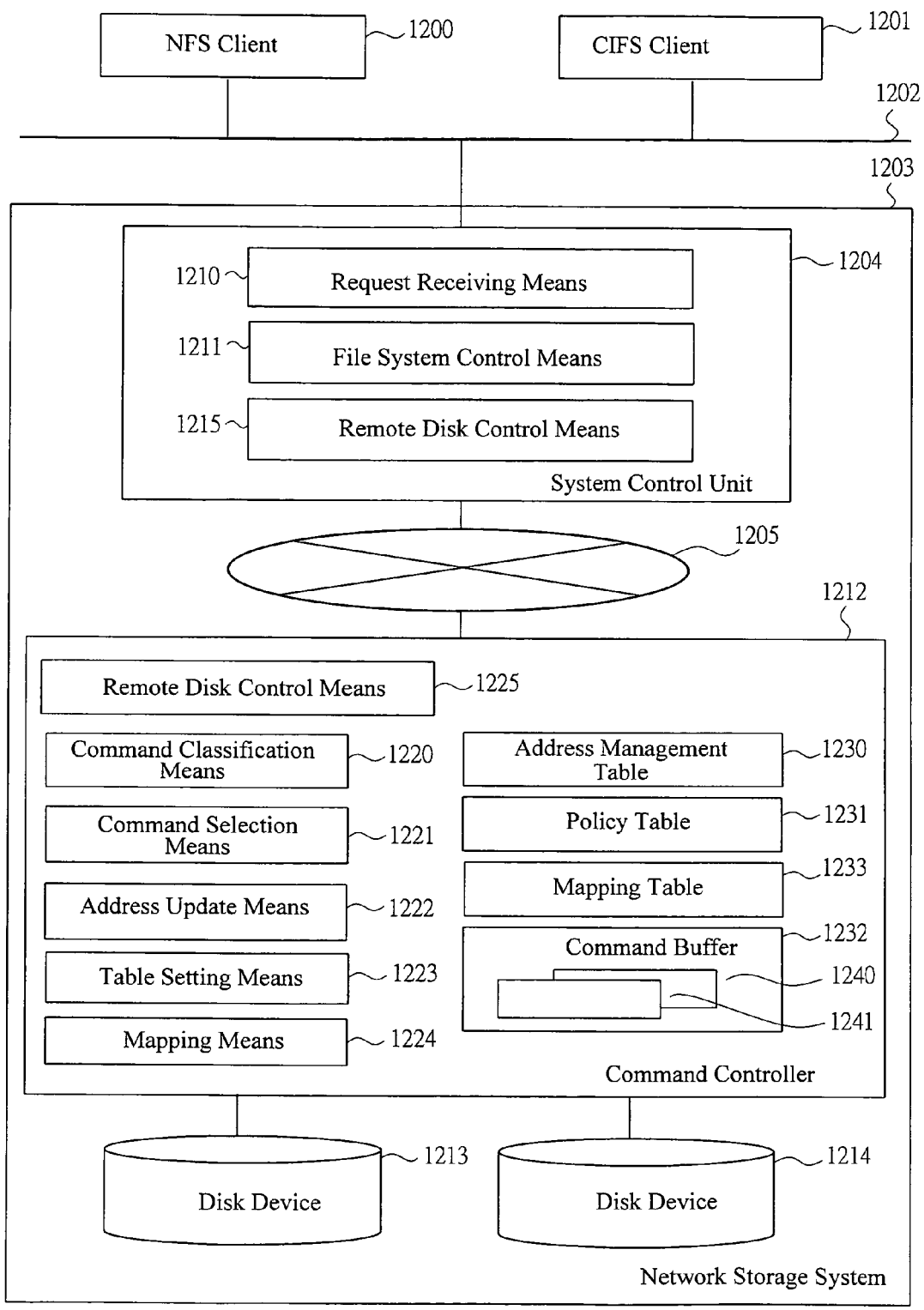
FIG. 12 is a block diagram showing an overall configuration of a network storage system according to a second modified example of the typical embodiment.

FIG. 12 shows an overall configuration example of a network storage system according to a second modified example of the embodiment of the present invention. The second modified example is different from the typical embodiment and the first modified example in that a system control unit 1204 comprises a remote disk control means 1215. It is different from the above embodiment also in that a command controller 1212 also comprises a remote disk control means 1225. Further, the system control unit 1204 and the command controller 1212 are connected through an internal network 1205. The internal network 1205 is a standard IP network. Although a network 1202 and the internal network 1205 are provided independently of each other in this modified example, they may be connected to the same network.

The remote disk control means 1215 packs disk access commands received from a file system control means 1211 into an iSCSI command and transfers it to the internal network 1205. In the second modified example, it is assumed that the SCSI command is used as a disk access command. Further, the remote disk control means 1225 in the command controller 1212 unpacks the iSCSI command received from the internal network 1205 and converts them into the disk access commands and transfers them to a command classification means 1220. The disk access commands transferred to the command classification means 1220 are processed in a way similar to that in the typical embodiment and the first modified example. The remote disk control means 1215 and 1225 can be realized by a well-known technology and so their detailed description is omitted here. However, in the second modified example, in the case of setting an address management table 1230, a policy table 1231, and a mapping flag, and a mapping address provided to a mapping means 1224, text commands prescribed in an iSCSI protocol are used such as Text Request PDUs (Protocol Data Units) and Text Response PDUs. In the iSCSI protocol, text commands other than the disk access commands can be exchanged between the remote disk control means 1215 and 1225. Therefore, in the second modified example, such text commands are prepared as to be used for setting of address information managed by a file system control means 1211, updating of the address management table 1230, and exchanging of a policy and mapping information which are set by the administrator through the client computer or console. It is thus possible to exchange information between the file system control means 1211 and the command controller 1212 not by using the unique interface but by using the iSCSI interface.

Third Modified Example of the Embodiment

In each network storage system of the above typical embodiment and of the first and second modified examples, the command controller for optimizing the commands has been provided independently of the disk device and the system control unit. In a third modified example, the command controller is built in the system control unit. In this case, the system control unit is provided with an interface for setting the address management table, the policy table, and the mapping table to values.

Fourth Modified Example of the Embodiment

In the network storage system of the above typical embodiment, the command controller for optimizing the commands has been provided independently of the disk device and the system control unit. Further, in the third modified example, the command controller has been built in the system control unit. In a fourth modified example of the typical embodiment, the command controller is built in the disk device.

In the fourth modified example, the disk device is provided with an interface for setting the address management table, the policy table, and the mapping table to values.

Fifth Modified Example of the Embodiment

In the above typical embodiment and modified examples, the command controller has operated steadily to optimize the commands. Effects on the command optimization are large when there are frequent file accesses from the client. However, if there are few file accesses from the client, the effects on the command optimization are small, so that it is unnecessary to optimize the commands.

Therefore, in a fifth modified example, if the administrator or system determines that the command optimization is unnecessary, the commands are delivered directly to the disk device without using the command controller. It is thus possible to reduce overheads for analyzing the commands if the optimization is unnecessary.

Figure 13:
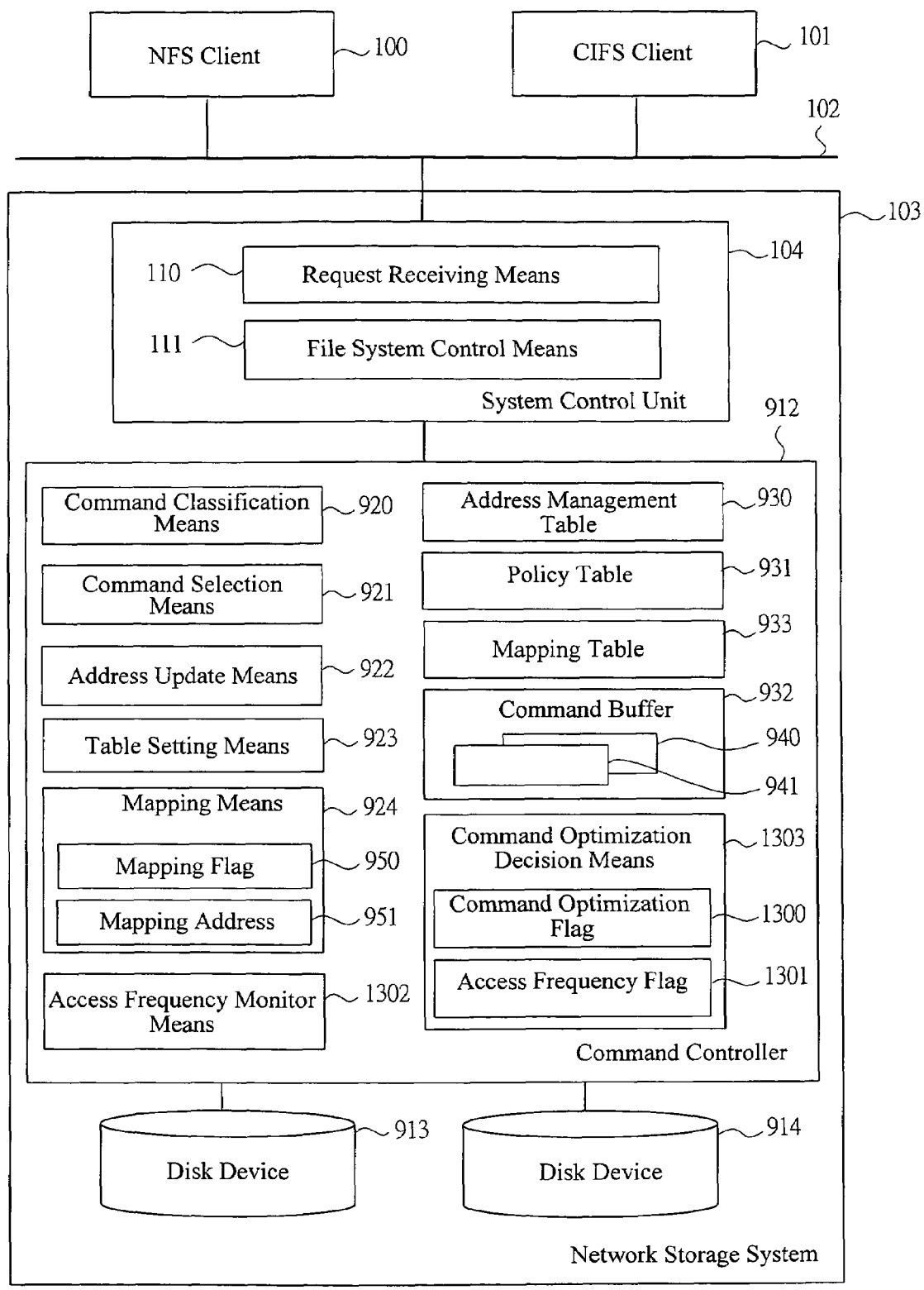
FIG. 13 is a block diagram showing an overall configuration of a network storage system according to a fifth modified example of the typical embodiment.

FIG. 13 shows a configuration of a network storage system according to the fifth modified example. In comparison with the configuration of the first modified example shown in FIG. 9, a command optimization flag 1300, an access frequency flag 1301, an access frequency monitor means 1302, and a command optimization decision means 1303 are added. Although the fifth modified example is shown by way of an example in which a function is added to the first modified example, it is applicable also to all of the network storage system of the typical embodiment and those of the second, third, and fourth modified examples.

The command optimization flag 1300 is a flag indicating whether a command is to be optimized. In the case where the administrator has instructed to optimize a command by using a setting wizard etc. at the time of, for example, configuring the network storage system, one is set to the flag. The setting wizard may be activated by using a console or through a Web server. In either case, it is necessary only to have in a setting wizard or sequence of the command controller an item for specifying whether the command is to be optimized. Further, the command optimization flag 1300 can be set and reset even after the network storage system is configured. In this case, an item for specifying or eliminating the command optimization is included in a management wizard of the network storage system.

The access frequency flag 1301 indicates whether too many disk access commands are transferred to the command controller 912. It is set and reset by the access frequency monitor means 1302.

The access frequency monitor means 1302 monitors the disk access commands transferred to the command controller 912 and, if the number of commands transferred to the command controller 912 exceeds a constant number Tmax, sets the access frequency flag 1301 to one. Values of a monitoring time interval Tc and the command number Tmax are set beforehand by the setting wizard etc. Accordingly, if not too many disk access commands are transferred, the commands can be transferred directly to the disk device without analyzing and classifying them, whereby the overheads for command analysis and classification can be reduced. However, it is checked whether a mapping has been changed.

The command optimization decision means 1303 determines whether a command is to be optimized by using the command optimization flag 1300 and the access frequency flag 1301.

Figure 14:
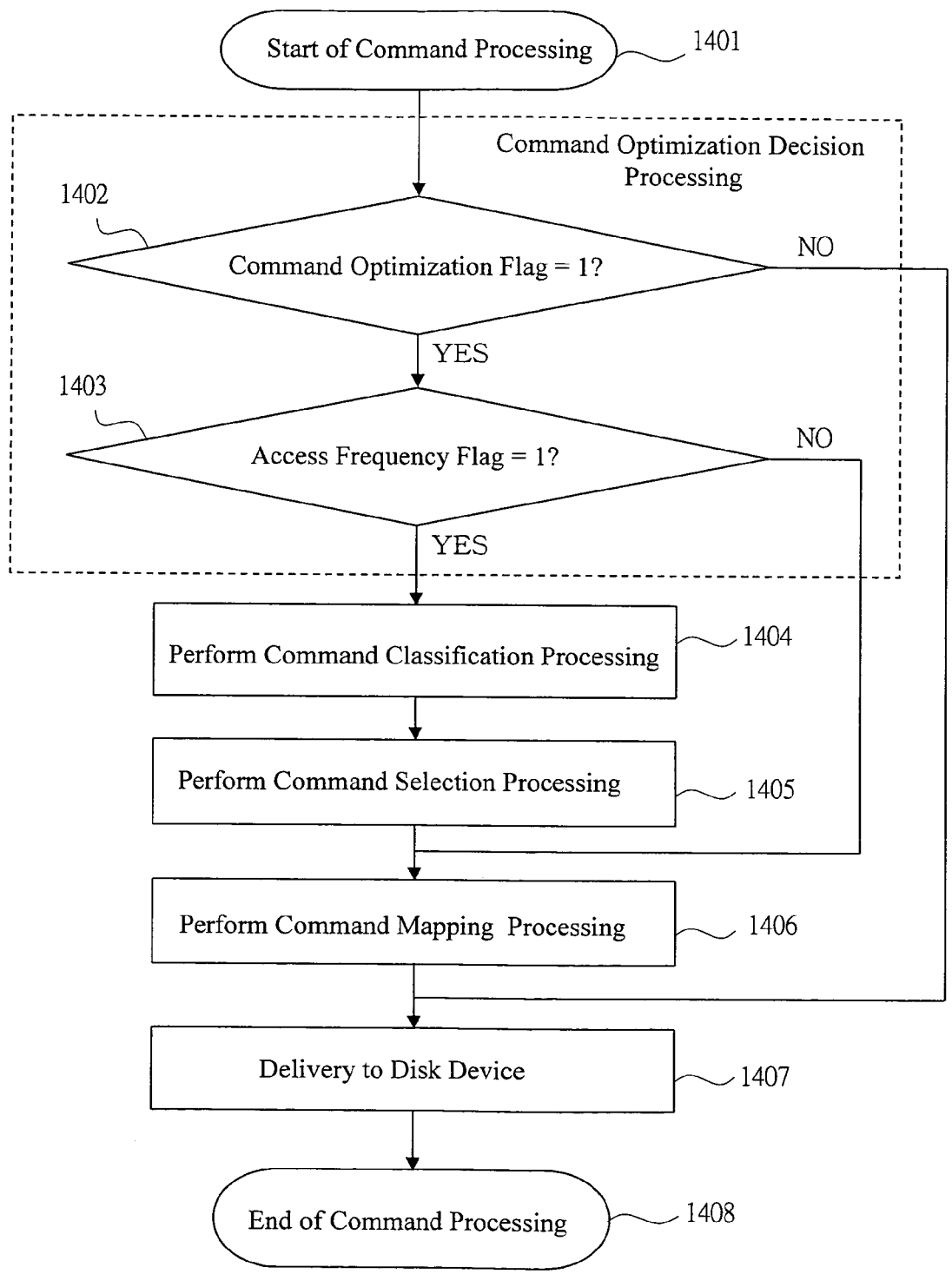
FIG. 14 is a flowchart showing a command processing of the fifth modified example.

FIG. 14 shows a flow of the command processing in the fifth modified example. At process 1402, the command optimization flag 1300 is checked to determine whether it is necessary to optimize a command. If the value of the command optimization flag 1300 is zero, the command is not to be optimized, so that the command is delivered to the disk device at process 1407. If the value of the command optimization flag 1300 is one, the command is to be optimized, so that the next process is performed. At process 1403, it is determined whether the access frequency flag 1301 is set to one. If the access frequency flag 1301 is set to one, process 1404 is performed. If the access frequency flag 1301 is set to zero, process 1406 is performed. Each of the processes 1402 and 1402 corresponds to a command optimization decision processing.

At process 1404, a command classification processing is performed. An internal flow of the command classification processing is the same as that of the typical embodiment. At process 1405, a command selection processing is performed. It is to be noted that the command selection processing is covered from the command buffer 932 to a portion for selecting commands. Next, at process 1406, a command mapping processing is performed. The command mapping processing corresponds to the processes 1107 and 1108 of FIG. 11. In the command mapping processing, the value of the mapping flag 950 is first checked and, if the value is set to one, an access target address of the command is changed to a mapping destination by referencing the mapping table 933. Therefore, if the mapping flag 950 is not set to one, the command is not analyzed. Finally, at process 1407, the command is delivered to the disk device.

As described above, in the fifth modified example, if it is unnecessary to optimize the command or if the number of disk access commands to be processed by the command controller 912 is small, the commands can be delivered to the disk device without analyzing and classifying the commands, whereby the commands can be optimized more flexibly.

What is claimed is:

1. A network storage system for receiving a file access request from a client via a network and accessing a disk device, comprising:
    a request receiving means;
    a file system control means; and
    a command controller, the command controller including an allocation information table, a command classification means, and a command selection means,
    wherein the request receiving means accepts file access requests from a client, the file system control means converts the file access requests accepted by the request receiving means into disk access commands that can be interpreted in the disk device, and
    the command controller controls delivery of the disk access command to the disk device,
    wherein the allocation information table registers allocation information managed by the file system control means, the allocation information including command classification identifiers, each of the command classification identifiers identifying each class of disk access commands, and ranges of logical block addresses, each of the ranges being allocated for each of file groups to be accessed by disk access commands belonging to a corresponding class of the disk access commands,
    the command classification means specifies a class of each of the disk access commands transferred from the file system control means by comparing an access target address of the each of the transferred disk access commands with the ranges of logical block addresses registered in the allocation information table and stores the each of the disk access commands in each buffer provided individually for each class to form classified queues of the disk access commands, and
    the command selection means consecutively repeats selecting a queue from the classified queues of the disk access commands and delivers a corresponding disk access command located at a head of the selected queue to the disk device.

2. The network storage system according to claim 1,
    wherein the command controller further includes a policy table registering a consecutive execution policy determined for each class of the disk access commands, and
    wherein the command selection means changes selection of one queue from the classified queues of the disk access commands to a consecutive selection of another queue from the classified queues of the disk access commands at a timing specified by the consecutive execution policy for a class of a disk access command corresponding to the one queue.

3. A command controller for delivering disk access commands to a disk device, comprising:
    an allocation information table registering command classification identifiers, each of the command classification identifiers identifying each class of disk access commands, and ranges of logical block addresses, each of the ranges being allocated for each file group to be accessed by the classified disk access commands, each of the classified disk access commands belonging to a corresponding class of the disk access commands;
    a command classification means; and
    a command selection means,
    wherein the command classification means specifies a class of each of received disk access commands by referring to said allocation information table and stores each of the received disk access commands in each buffer provided individually for each class to form classified queues of the disk access commands, and
    the command selection means consecutively repeats selecting a queue from the classified queues of the disk access commands and delivering a corresponding disk access command located at a head of the selected queue to the disk device, and
    wherein the command selection means performs transition of selection between the queues selected from the classified queues during the consecutive selections of queues according to a consecutive execution policy determined for a class of disk access commands previously selected.

4. A command control method in a network storage system, the network storage system having a system control unit accepting file access requests from the client via a network and converting the file access requests into disk access commands, one or more disk devices and a command controller accepting the disk access commands from the system control unit and transferring the disk access commands to the disk device, the command control method comprising the steps of:
registering allocation information managed by said file system control means in a table, the allocation information including command classification identifiers, each of the command classification identifiers identifying each class of disk access commands, and ranges of logical block addresses, each of the ranges being allocated for each of file groups to be accessed by disk access commands belonging to a corresponding class of the disk access commands;
specifying a class of each of the disk access commands transferred from the file system control means by comparing an access target address of each of the transferred disk access commands with the ranges of logical block addresses registered in the table;
storing each of the disk access command in each buffer provided individually for each class to form classified queues of the disk access commands; and
consecutively repeating selecting a queue from the classified queues of the disk access commands and delivers a corresponding disk access command located at a head of the selected queue to the disk device.

5. The command control method in a network storage system according to claim 4, further comprising the step of registering a consecutive execution policy determined for each class of the disk access commands in a policy table,
wherein the command controller changes selection of a queue to a consecutive selection of another queue at a timing specified by the consecutive execution policy for a class of a disk command corresponding to the one classified queue of commands.

6. The command control method in a network storage system according to claim 4, further comprising the step of monitoring a flow rate of the disk access command applied to the command controller, and wherein, when the flow rate is lower than a threshold, the command controller transfers accepted disk access command directly to the disk device instead of execution of said steps of specifying and storing.

* * * * *